(12) United States Patent
Gottschlich

(10) Patent No.: US 11,188,324 B2
(45) Date of Patent: Nov. 30, 2021

(54) METHODS, SYSTEMS, AND ARTICLES OF MANUFACTURE TO PERFORM HETEROGENEOUS DATA STRUCTURE SELECTION VIA PROGRAMMER ANNOTATIONS

(71) Applicant: Intel Corporation, Santa Clara, CA (US)

(72) Inventor: Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 16/725,928

(22) Filed: Dec. 23, 2019

(65) Prior Publication Data

US 2020/0133665 A1    Apr. 30, 2020

(51) Int. Cl.
*G06F 8/77* (2018.01)
*G06F 8/75* (2018.01)
*G06F 16/22* (2019.01)

(52) U.S. Cl.
CPC .............. *G06F 8/77* (2013.01); *G06F 8/75* (2013.01); *G06F 16/2246* (2019.01)

(58) Field of Classification Search
CPC ........... G06F 8/77; G06F 16/2246; G06F 8/75
See application file for complete search history.

(56) References Cited

U.S. PATENT DOCUMENTS

| | | | | |
|---|---|---|---|---|
| 6,751,622 B1 * | 6/2004 | Puri | .................. | G06F 16/83 |
| 8,121,976 B2 * | 2/2012 | Kalia | .................. | G06F 16/284 |
| | | | | 707/601 |
| 10,620,866 B1 * | 4/2020 | Kumar | .................. | G06F 16/288 |
| 2002/0111697 A1 * | 8/2002 | Kimelman | .......... | G06F 11/3409 |
| | | | | 700/5 |
| 2003/0177197 A1 * | 9/2003 | de Bonet | .............. | G06Q 50/12 |
| | | | | 709/213 |
| 2008/0270435 A1 * | 10/2008 | Furusho | ............. | G06F 16/9027 |

(Continued)

OTHER PUBLICATIONS

Ohsawa et al., "A New Tree Type Data Structure with Homogeneous Nodes Suitable for a Very Large Spatial Database" (Year: 1990).*

(Continued)

*Primary Examiner* — Phillip H Nguyen
(74) *Attorney, Agent, or Firm* — Hanley, Flight & Zimmerman, LLC

(57) ABSTRACT

Methods, apparatus, systems, and articles of manufacture to perform heterogeneous data structure selection via programmer annotations. An example apparatus includes a phase tracker to identify a first phase and a second phase, a cost predictor to estimate interaction costs of interacting with respective types of data structures within the first phase and the second phase, a tree constructor to construct a tree corresponding to a first data structure type, the tree including a first node in the first phase, a second node in the second phase, and an edge connecting the first node and the second node, the second node representing a second data structure type different from the first data structure type, a transformation cost calculator to calculate a transformation cost for the edge, and a branch selector to select a sequence of data structures based on the combined interaction costs and transformation costs.

27 Claims, 8 Drawing Sheets

(56) References Cited

U.S. PATENT DOCUMENTS

| | | | | |
|---|---|---|---|---|
| 2011/0128960 A1* | 6/2011 | Bando | ................... | H04L 45/745 370/392 |
| 2011/0154289 A1* | 6/2011 | Mannarswamy | ..... | G06F 8/4442 717/106 |
| 2013/0226959 A1* | 8/2013 | Dittrich | ............... | G06F 16/2453 707/769 |
| 2015/0058830 A1* | 2/2015 | Verlaguet | .................. | G06F 8/40 717/136 |
| 2017/0357486 A1* | 12/2017 | DeLuca | .................... | G06F 8/30 |
| 2019/0340288 A1* | 11/2019 | Bastian | ................... | G06F 17/18 |

OTHER PUBLICATIONS

Cormen et al., "Introduction to Algorithms," Third Edition (3rd ed.), [https://edutechlearners.com/download/Introduction_to_algorithms-3rd%20Edition.pdf], MIT Press, 2009, 1313 pages.

Idreos et al., "Learning Data Structure Alchemy," [https://stratos.seas.harvard.edu/files/stratos/files/learningdatastructurealchemy.pdf], IEEE Computer Society Technical Committee on Data Engineering, 2019, 12 pages.

Kraska et al., "The Case for Learned Index Structures," [https://dl.acm.org/doi/10.1145/3183713.3196909], SIGMOD Jun. 10-15, 2018, Houston, Texas, 16 pages.

Wikipedia, "Database Index," [https://en.wikipedia.org/w/index.php?title=Database_index&oldid=926325740], edited by William Avery on Nov. 15, 2019, 6 pages.

Loncaric et al., "Generalized Data Structure Synthesis," [https://homes.cs.washington.edu/~mernst/pubs/generalized-synthesis-icse2018.pdf], ISCE May 27-Jun. 3, 2018, Gothenberg, Sweden, 11 pages.

Gottschlich et al., "The Three Pillars of Machine Programming", ArXiv, May 8, 2018, retrieved from https://arxiv.org/pdf/1803.07244.pdf, 11 pages.

* cited by examiner

400

```
mlds:start_phase(populate_system);
read_OS_files();
read_user_files();
read_tmp_files();
mlds::end_phase(populate_system);
```
— 410

```
launch_OS();
```
— 420

```
mlds::start_phase(main_polling_loop);
run_OS();
mlds::end_phase(main_polling_loop);
```
— 430

```
mlds::start_phase(uninitialize_system);
store_tmp_files();
clear_memory();
uninit_data_structures();
mlds::end_phase(uninitialize_system);
```
— 440

FIG. 4

METHODS, SYSTEMS, AND ARTICLES OF MANUFACTURE TO PERFORM HETEROGENEOUS DATA STRUCTURE SELECTION VIA PROGRAMMER ANNOTATIONS

FIELD OF THE DISCLOSURE

This disclosure relates generally to code development, and, more particularly, to methods, systems, and articles of manufacture to perform heterogeneous data structure selection via programmer annotations.

BACKGROUND

A data structure (DS) is a software construct that may be used to logically represent the storage of data. Different operations may be performed on the data structure to, for example, insert data, remove data, access data, move data, etc. Programmers use data structures in general purpose programming, such as C/C++. There are many types of data structures including, for example, arrays, vectors, linked lists, binary trees, and hash maps. Data structures serve as a fundamental building block for software systems and, generally have an effect on the overall efficiency of a software program.

BRIEF DESCRIPTION OF THE DRAWINGS

FIG. 4 is an illustration of example annotations that may be recognized by the example data structure selector of FIGS. 1 and/or 2.

The figures are not to scale. In general, the same reference numbers will be used throughout the drawing(s) and accompanying written description to refer to the same or like parts.

Figure 1:
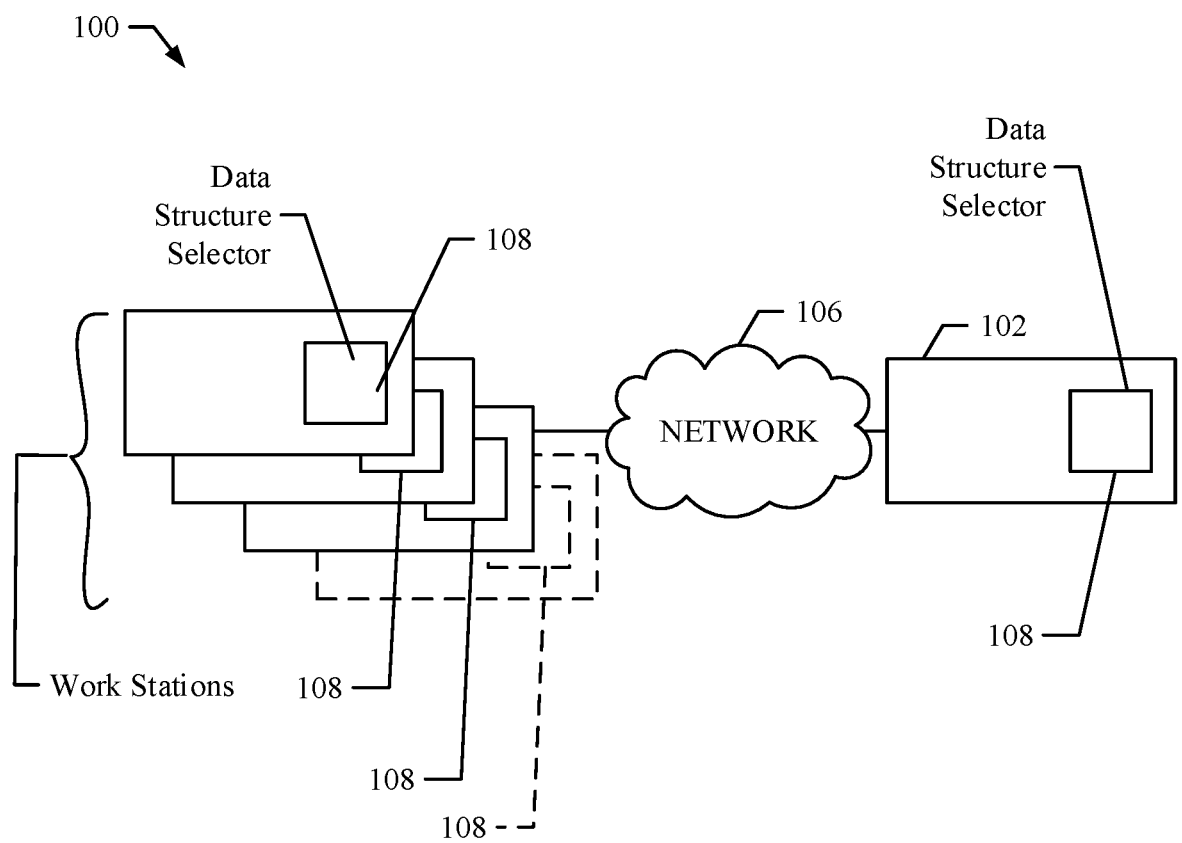
FIG. 1 is a schematic illustration of an example data structure selection system constructed in accordance with the teachings of this disclosure to select data structures.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Data structures serve as a fundamental building block for software systems and, generally have an effect on the overall efficiency of a software program. As many different types of data structures exist, the selection criteria used by many programmers, including expert ones, to select the data structure that is most efficient for a particular software problem can be error-prone. For example, traditional computational complexity analysis techniques that programmers use to choose a particular data structure to provide a rough approximation of the performance of the data structures. Moreover, such complexity analysis (i.e., Big O( ) notation), does not consider the efficiency impact of computer microarchitecture. Further, many programmers might not be experts in data structure computational analysis and therefore use generalized data structures that can perform reasonably for most problems but sub-optimally for nearly all of them.

In some examples, programmers may mistakenly select the types of data structures that they are the most familiar and/or comfortable with, resulting in a software program(s) that, while functionally sound, are not as computationally efficient as possible.

Further, data structure selection is usually performed based on what the programmer believes is the most computationally expensive component of the program, limiting the selection to a single DS per problem. However, in many cases, a fusion of multiple heterogeneous data structures may provide a solution that is overall more efficient than a single DS. Yet, due to the laborious nature of programming and maintaining such a solution, it is generally not performed.

Utilizing and/or otherwise selecting a particular data structure affects a performance metric of an application executing on a platform. Performance metrics include, but are not limited to, an amount of memory consumed by the data structure, or a speed at which the data structure is capable of transferring (e.g., reading, writing) and/or modifying data, a number of computer processing unit (CPU) cycles consumed by particular memory operation(s), etc. For instance, performance metrics associated with an amount of memory being consumed by the application become important for circumstances in which the application operates on a mobile device platform that has a finite amount of memory. On the other hand, performance metrics associated with a speed at which data can be transferred becomes important for circumstances in which the application processes relatively large quantities of data in real-time. In still other examples, an ordered list data structure type enables dataset retrieval to occur in a relatively fast manner, but that data structure type exhibits substantially slower element storage capabilities.

The particular data structures are typically selected by a code developer during a code development process of the application. As such, the code developer requires detailed knowledge of a relatively large number of different data structure types, a detailed knowledge of syntax implementation of the different data structure types, and a detailed knowledge of which data structure types best improve the performance metrics of interest. Additionally, in the event that an application uses a particular type of data and/or different data types throughout its operation, such evolving inputs and/or evolving heterogeneous systems are too numerous for the code development personnel to consider effectively. For example, an ordered list data type (e.g., data structure) allows relatively fast retrieval of a dataset, but that same data structure type exhibits a relatively slow ability for inserting new elements. In another example, a hash table data type facilitates relatively fast insertion and/or retrieval of particular dataset items, but tasks related to listing an entire dataset in a particular order (e.g., numeric order, alphabetic order, etc.) occurs relatively slowly. Still further, in the event a first data structure type is selected at a first time and is observed to exhibit relatively good performance characteristics in connection with a first type of input data, in the event the input data types and/or input data quantities change throughout the use of the coded application, performance characteristics may adversely change (e.g., degrade). Because data structure selection is a laborious process requiring substantial expertise, numerous design factors, and/or possible dynamic operating conditions, applications written and/or otherwise developed by code development personnel suffer from one or more performance metrics when particular data structures are selected. In other words, relying on the discretion of the code development personnel may result in sub-standard application performance.

Appropriate selection of data structures allows one or more performance metrics of an application to improve. Examples disclosed herein enable selection of data structure types and/or combinations thereof during code development in a manner that avoids discretionary choices by code developers, and considers an effect on one or more performance metrics. Additionally, examples disclosed herein enable such combinatorial data structure type selection(s) without a priori knowledge of data type(s) to be implemented with the data structure(s) of the application. Stated differently, as disclosed herein, a sequence of data structures, rather than a single data structure, may be recommended as, during different phases of execution of a program, a first different data structure type may be more efficient than a second data structure type. Such recommendations also consider the cost of transitioning from one data structure type to another. Examples disclosed herein evaluate the many different combinations of data structure types in connection with heterogeneous systems and evolving application usages, while removing the discretionary errors (e.g., code developer assumptions of the best data structure type(s) to use) of the code developer such that inexperienced and/or erroneous selection of data structure types can be prevented.

FIG. 1 is a schematic illustration of an example data structure selection system 100. In the illustrated example of FIG. 1, the data structure selection system 100 includes an example server 102 communicatively connected to an example network 106. The example server 102 includes an example data structure selector 108 to facilitate selection of code data structures (e.g., data structure types), as described in further detail below. In some examples, the example data structure selector 108 of the example server 102 is communicatively connected to any number of example workstations 110 via the example network 106 (e.g., in circumstances where the respective workstations do not have their own data structure selector 108). In some examples, respective workstations 110 communicatively connect to the example data structure selector 108 during code drafting activities of a user (e.g., a software developer), in which the example data structure selector 108 renders a graphical user interface (GUI) and/or terminal screen for data input/output. However, in some examples, the data structure selector 108 may be located within a subset of each respective workstation 110 in a self-contained manner.

Figure 2:
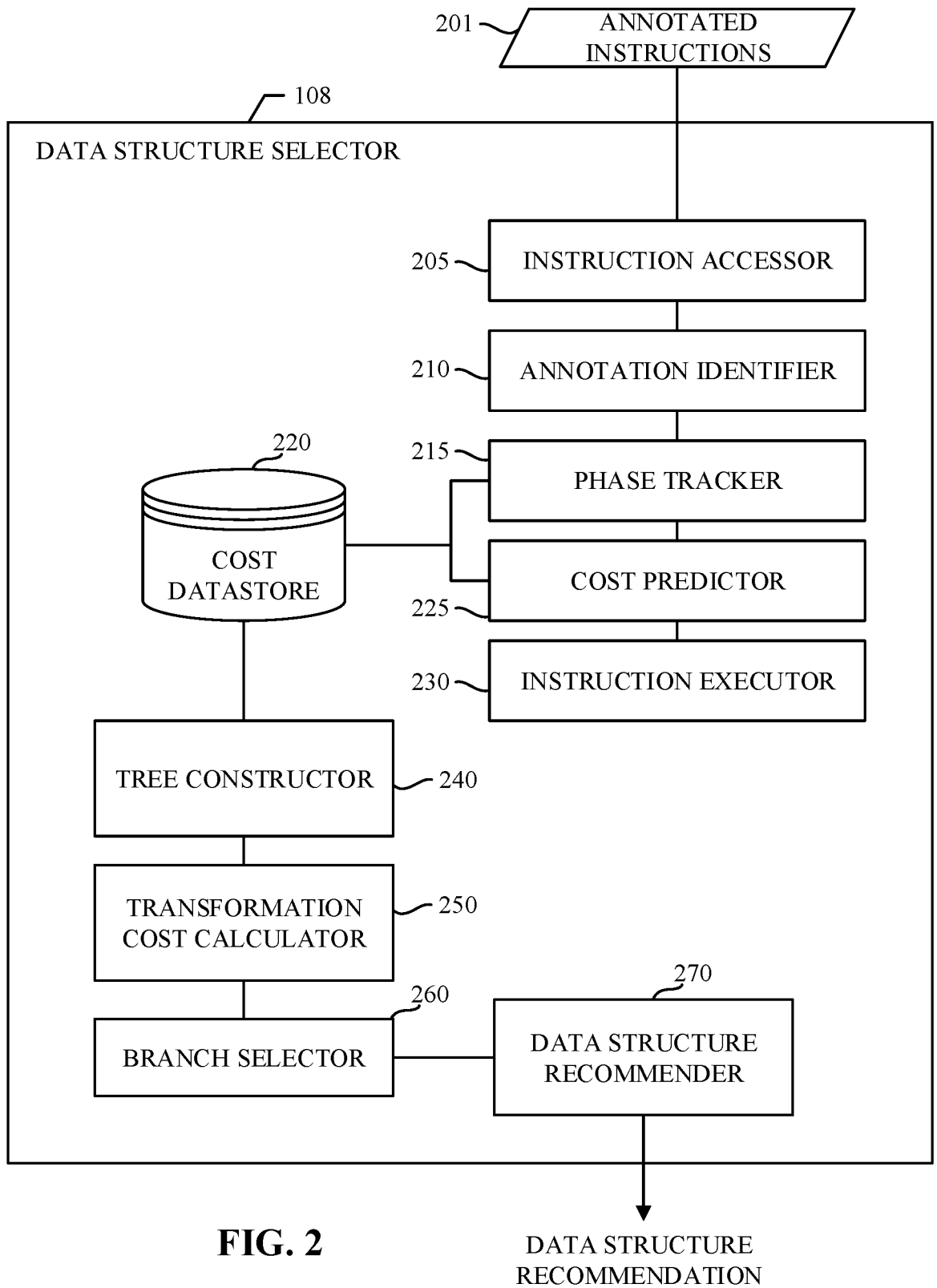
FIG. 2 is a schematic illustration of the example data structure selector of FIG. 1.

FIG. 2 is a schematic illustration of the example data structure selector 108 of FIG. 1. The example data structure selector 108 of FIG. 2 receives annotated instructions 201, and generates data structure recommendations suggesting one or more data structures to be used across different phases of execution of the annotated instructions. The example data structure selector 108 includes an instruction accessor 205, an annotation identifier 210, a phase tracker 215, a cost datastore 220, a cost predictor 225, an instruction executor 230, a tree constructor 240, a transformation cost calculator 250, a branch selector 260, and a data structure recommender 270.

The example data structure selector 108 enables automatic selection and/or recommendation of potentially many (e.g., one or more) different data structures for a given general-purpose problem presented in the annotated instructions 201. In examples disclosed herein, the annotated instructions 201 represent a target program that is written using generic data structures. In examples disclosed herein, the annotated instructions 201 represent source code (e.g., un-compiled code) written in C/C++. However, any past, present, and/or future instruction language, scripting language, programming language, etc. may additionally or alternatively be used. For example, the annotated instructions may be represented using any of the following languages: C, C++, Java, C#, Perl, Python, JavaScript, etc. The example annotated instructions 201 include programming annotations, separating the program into unique intentional phases based on distinct data structure behavioral patterns. The semantics of these phases (i.e., their intentional meaning) does not need to be known or even well-understood by the developer of the annotated instructions 201, a priori. Example approaches disclosed herein learns the semantic meaning in the context of data structure selection.

The example instruction accessor 205 of the illustrated example of FIG. 2 reads the contents of the annotated instructions 201. In examples disclosed herein, the annotated instructions 201 are stored local to the computing system on which the example data structure selector 108 is implemented. In such an example, the example instruction accessor 205 reads the instructions from a local memory (e.g., a hard disk drive, a solid state drive, a random access memory, etc.). However, in some examples, the annotated instructions may be accessed via a remote data storage location such as, for example, a remote server (e.g., the cloud).

The example annotation identifier 210 of the illustrated example of FIG. 2 analyzes an instruction accessed by the instruction accessor 205 to determine whether the instruction is a start annotation, an end annotation, or whether the instruction, when executed, would cause interaction with a data structure. In examples disclosed herein, start annotations are identified using the text "mlds:start_phase". Likewise, in examples disclosed herein, end annotations are identified using the text "mlds:end_phase". However, any other annotation format may additionally or alternatively be used to identify the start or end of a phase. In some examples, the start and/or end annotation may be included in a comment in the annotated instructions 201 (e.g., inserted by a developer). In some examples, the example annotation identifier 210 determines whether an instruction, when executed, would result in interaction with a data structure. In examples disclosed herein, interaction with the data structure refers to any operation with respect to a data structure (e.g., a read operation, a write operation, a sort operation, etc.). If an interaction with a data structure is identified, the example annotation identifier 210 enables the cost predictor 225 to predict the cost of such interaction.

In response to the annotation identifier 210 identifying a start annotation and/or end annotation, the example phase tracker 215 of the illustrated example of FIG. 2 records a corresponding start and/or end of a phase in the cost datastore 220. The start record and/or the end record signify the opening or closing of a phase within the target program. Within different phases, different types of data accesses may be performed. As such, different types of data structures may be more suited for use in one phase versus another phase. The start and end records enable boundaries to be created between those phases. In some examples, a phase may be internal to another phase. For example, an example outer phase may include one or more inner phases (e.g., representing a loop). In some examples, the phase tracker 215 implements means for tracking.

The example cost datastore 220 of the illustrated example of FIG. 2 is implemented by any memory, storage device and/or storage disc for storing data such as, for example, flash memory, magnetic media, optical media, etc. Furthermore, the data stored in the example cost datastore 220 may be in any data format such as, for example, binary data, comma delimited data, tab delimited data, structured query language (SQL) structures, etc. While in the illustrated example the cost datastore 220 is illustrated as a single element, the example cost datastore 220 and/or any other data storage elements described herein may be implemented by any number and/or type(s) of memories. In the illustrated example of FIG. 2, the cost datastore 220 stores cost estimations associated with interacting with different types of data structures during execution of a target program. The example cost datastore 220, in some examples, also stores estimated costs of transitioning between different types of data structures during execution of the target program.

The example cost predictor 225 of the illustrated example of FIG. 2, in response to the annotation identifier detecting an interaction with a data structure, predicts a cost of the interaction for different data structures that could be used. In some examples, this cost is referred to as an interaction cost. For example, if the instruction were to add a value to a data structure (e.g., a write operation), the cost predictor 225 estimates the cost (e.g., in execution time, memory, processor cycles, power consumption, etc.) of adding the value to different data structures that support addition of the value (e.g., a hash, an array, a list, etc.). Different types of operations may be more efficient for particular data structures. As a result, different costs may be predicted for the same interaction, based on the type(s) of data structures for which a cost is predicted. The example cost predictor 225 adds the predicted cost(s) to the cost datastore 220 in association with the most recently opened phase and data structure type. In some examples, the example cost predictor 225 implements means for estimating.

The example instruction executor 230 of the illustrated example of FIG. 2 executes an instruction from the annotated instructions 201 in response to the addition of the predicted cost to the cost datastore 220 or the determination that the instruction does not result in data modification executes the instruction. Execution of the instruction enables a sample execution of the target program to be conducted so that the data structure selector 108 can learn the types of data structure operations performed in connection with the target application. In examples disclosed herein, if the instruction results in interaction with the data structure, a single data structure is used as a placeholder (e.g., as opposed to each of the different types of data structures). Using a placeholder data structure enables data to be stored in a manner that allows the execution of the program to proceed and result in an accurate prediction of estimated interaction cost(s). In some examples, the instruction executor 230 implements means for executing.

The example tree constructor 240 of the illustrated example of FIG. 2 arranges phases identified by the phase tracker 215 into a sequence of monotonically increasing phases. Consider, for example, a scenario where the target program includes a first populate phase, a first access phase, a second populate phase, and second access phase that are executed (in order). Although the target program has only two unique phases (e.g., a populate phase and an access phase), the sequential ordering of the phases may have temporal and spatial side-effects. For example, if the first populate phase uses a dynamic array for population, and a binary tree were used for the first access phase, there is a specific array-to-tree data transformation cost and an additional specific tree-to-array data transformation cost for moving from the first populate phase, to the first access phase, to the second populate phase, to the second access phase, respectively. As such, each sequential phase that is executed is considered as unique even if it has been repeated multiple times.

Using the sequentially ordered phases, the example tree constructor 240 builds heterogeneous data structure trees. Example data structure trees are shown in the illustrated example of FIG. 7, below. Because, in some examples, a particular type of data structure may be more efficient when used in a particular phase, it may be more programmatically efficient to transition from a first data structure in a first phase to a second data structure and a second phase. The example data structure trees represent transitions between different types of data structures at such phase boundaries. In some examples, the example tree constructor 240 implements means for constructing.

The example transformation cost calculator 250 of the illustrated example of FIG. 2 processes the trees to estimate transformation cost(s) for each branch. The example transformation cost calculator 250 analyzes each tree and augments the edge-based data transformation costs based on the types of operations performed in that particular phase. For example, if an analyzed phase were to only include write operations, there may be no need for data transformation, because the new data structure can be generated without needing the data from the prior data structure. In examples disclosed herein, three costs are considered by the example transformation cost calculator 250, including a normal data transformation cost, a fusion cost, and a linear data transformation cost. The example normal data transformation cost represents a cost to transition from phase N−1 to phase N to phase N+1, where N represents the current phase. The fusion cost represents the cost of the N−1 phase's data structure and the phase N's data structure into a singular N+1 data structure. The example linear data transformation cost represents a cost using phase N−1's data structure with a zero data transformation cost for phase N and its normal data transformation cost for phase N+1. In some examples, when calculating the linear data transformation cost, the example transformation cost calculator 250 also augments the actual cost estimate of phase N operations using phase N−1's data structure for completeness. In some examples, the transformation cost calculator 250 implements means for calculating.

The example branch selector 260 of the illustrated example of FIG. 2 selects a branch representing transitions between data structures with a least cost for each tree. That is, the branch selector 260 selects a sequence of heterogeneous data structures to be used in implementing the example target program. For example, the cost of the data structure sequence ABA may have a lower cost than the data structure sequence ABC (where A represents a first data structure type, B represents a second data structure type different from the first data structure type, and C represents a third data structure type different from both the first data structure type and the second data structure type). In such an example, the branch selector 260 selects the data structure sequence ABA for the tree having a root data structure of A. In some examples, the branch selector 260 implements means for selecting.

The example data structure recommender 270 of the illustrated example of FIG. 2 recommends the sequence of heterogeneous data structures selected by the branch selector 260. In examples disclosed herein, the example data structure recommender 270 transmits a notification to the developer (e.g., a user) identifying the selected sequence of data structures. In some examples, the recommendation is instead provided to a compiler that uses the recommended sequence of data structures when compiling the annotated instructions 201 for execution. In some examples, the data structure recommender 270 implements means for recommending.

While an example manner of implementing the data structure selector 108 of FIG. 1 is illustrated in FIG. 2, one or more of the elements, processes and/or devices illustrated in FIG. 2 may be combined, divided, re-arranged, omitted, eliminated and/or implemented in any other way. Further, the example instruction accessor 205, the example annotation identifier 210, the example phase tracker 215, the example cost predictor 225, the example instruction executor 230, the example tree constructor 240, the example transformation cost calculator 250, the example branch selector 260, the example data structure recommender 270, and/or, more generally, the example data structure selector 108 may be implemented by hardware, software, firmware and/or any combination of hardware, software and/or firmware. Thus, for example, any of the example instruction accessor 205, the example annotation identifier 210, the example phase tracker 215, the example cost predictor 225, the example instruction executor 230, the example tree constructor 240, the example transformation cost calculator 250, the example branch selector 260, the example data structure recommender 270, and/or, more generally, the example data structure selector 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example instruction accessor 205, the example annotation identifier 210, the example phase tracker 215, the example cost predictor 225, the example instruction executor 230, the example tree constructor 240, the example transformation cost calculator 250, the example branch selector 260, the example data structure recommender 270, and/or, more generally, the example data structure selector 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data structure selector 108 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
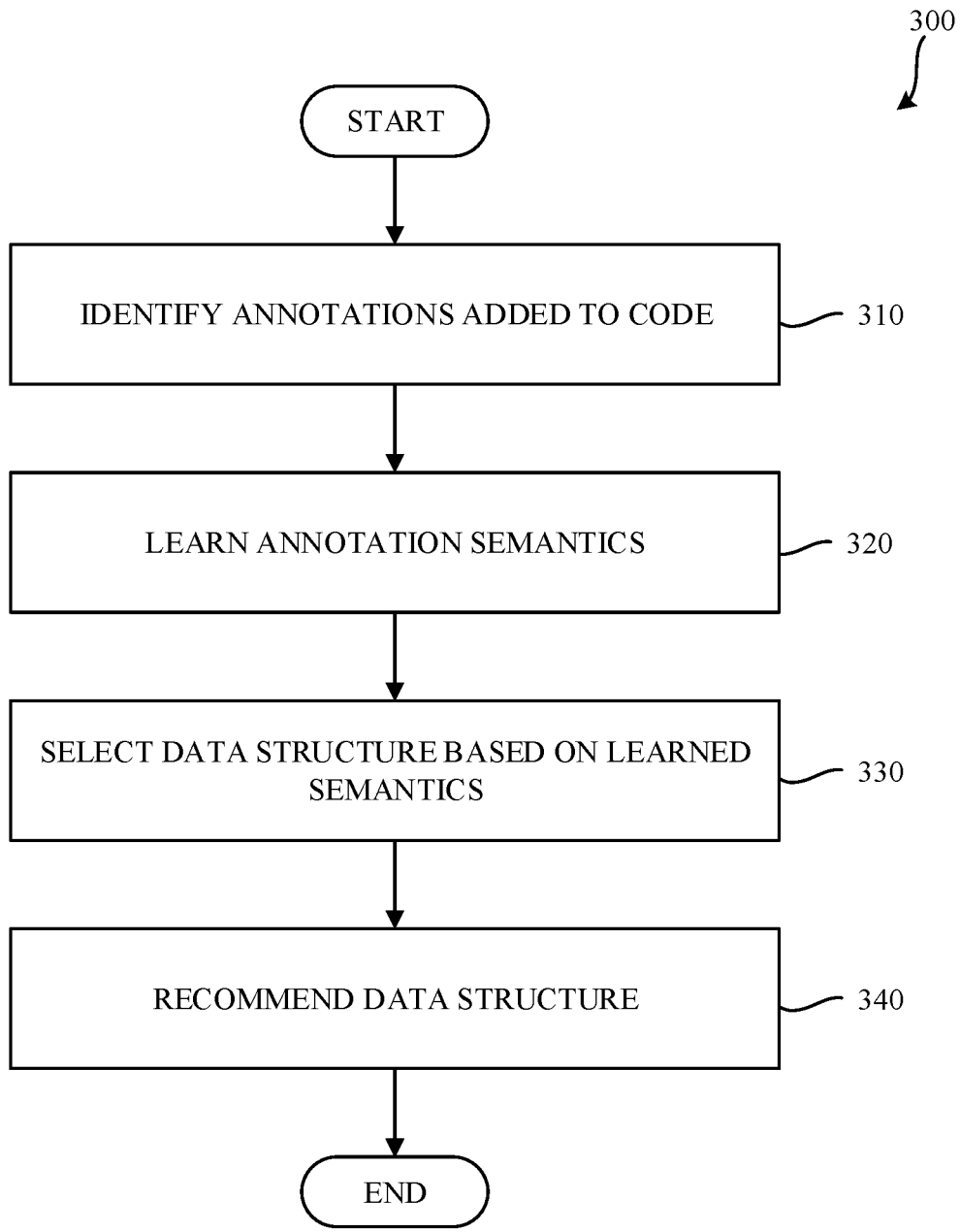
FIG. 3 is a flowchart representative of machine readable instructions that may be executed to implement the example system of FIG. 1 and/or the example data structure selector of FIGS. 1 and/or 2 to select data structures.
Figure 5:
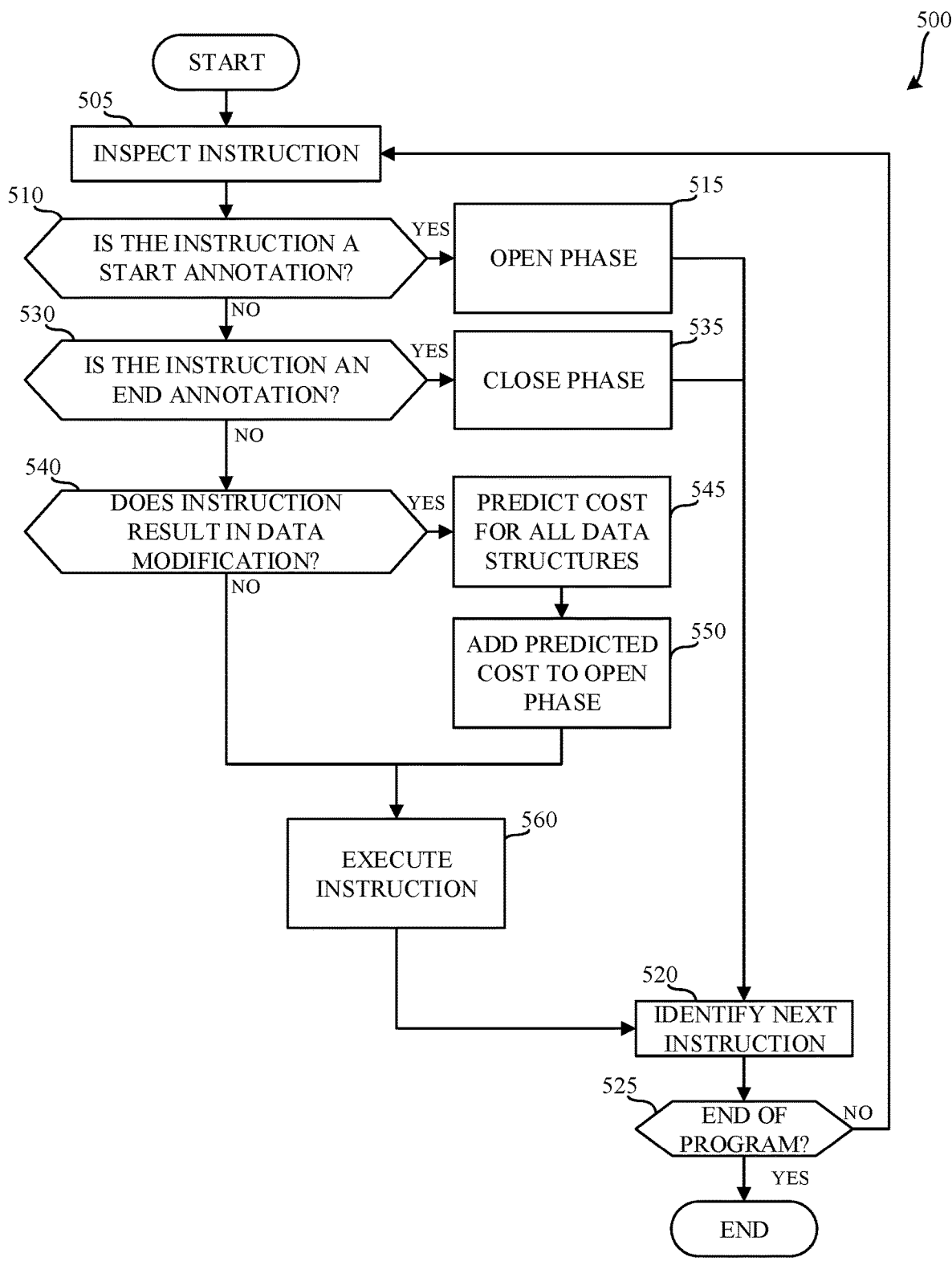
FIG. 5 is a flowchart representative of example machine readable instructions that may be executed to implement the example system of FIG. 1 and/or the example data structure selector of FIGS. 1 and/or 2 to learn annotation semantics.

Flowcharts representative of example hardware logic, machine readable instructions, hardware implemented state machines, and/or any combination thereof for implementing the example data structure selector 108 of FIG. 2 are shown in FIGS. 3, 5, and/or 6. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart(s) illustrated in FIGS. 3, 5, and/or 6, many other methods of implementing the example data structure selector 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 5, and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine readable instructions that may be executed to implement the example system of FIG. 1 and/or the example data structure selector of FIGS. 1 and/or 2 to select data structures. The example process 300 of the illustrated example of FIG. 3 begins when the example instruction accessor 205 and/or the example annotation identifier 210 inspect annotated instructions 201 to identify annotations added to those instructions. (Block 310).

The example phase tracker 215 and/or the example cost predictor 225 of the example data structure selector 108 learn the annotation semantics included in the annotated instructions 201. (Block 320). In examples disclosed herein, learning is achieved by executing a target program and monitoring data structure interactions during execution of the target program. In examples disclosed herein, the target program is executed at least one time. However, in some examples, the target program is executed multiple times with statistically diverse but representative data. An example process for learning annotation semantics is disclosed below in connection with FIG. 5.

The example tree constructor 240 and/or the example transformation cost calculator 250 select a data structure based on the learned annotation semantics. (Block 330). In short, the example tree constructor 240 and/or the example transformation cost calculator 250 arrange phases identified in the context of block 320 into a sequence of phases, and create trees representing different data types and/or transitions between those data types that may be used across those phases. Costs are analyzed for each of the sequences of data structures, and a data structure sequence with the least cost is selected. An example process for selecting a data structure is disclosed below in connection with FIG. 5. The example data structure recommender 270 then recommends the selected data structure for use in connection with execution of the annotated instructions 201. (Block 340).

FIG. 4 is an illustration of example annotations 400 that may be recognized by the example data structure selector of FIGS. 1 and/or 2. In examples disclosed herein, annotation of the instructions is performed by a developer (e.g., a user), and enables the developer to provide some intuition about possible phases of execution of the program. The illustrated example of FIG. 4 includes instructions written in a C++ language. However, any other programming language and/or syntax may additionally or alternatively be used. While the example annotations of FIG. 4 begin with the text "mlds," many other forms and/or syntaxes of annotations may additionally or alternatively be used. Moreover, the developer is enabled to add annotations in whichever way they desire, so long as the annotations capture different phases of the program. As used herein, a program phase is defined as a period of a program in which a particular event and/or behavior is occurring. For example, FIG. 4 illustrates three main phases.

The example instructions 400 begin with a first phase 410. The first example phase is where the main data structures used in the program are populated with data. In some examples, identifying the start of a population phase is important because certain types of data structures may be used more optimally in a population phase where data structure access (e.g., read operations) do not typically occur. The first phase is identified using the label "populate_system". The example first phase begins with a start annotation and ends with a corresponding end annotation. In the illustrated example of FIG. 4 the start annotation is represented as "mlds:start_phase", and the end annotation is represented as "mlds:end_phase". However, any other approach to annotating a start and/or end of phase may additionally or alternatively be used. For example, the start and end_phase annotations may be included in comments included in the annotated instructions. Within the first example phase 410, a set of instructions are executed to, for example, read operating system files, read user files, and read temporary files.

After the end of the first phase (e.g., after block 410), the example annotated instructions 201 include instructions 420 that are executed outside of the context of an annotated phase. For example, the instructions 420, when executed, resulted in the launching of an operating system.

A second phase 430 is identified as a "main_polling_loop" phase, and is represented by a start annotation and an end annotation. in this phase the program is running until exit. In the second phase 430, the data structures will likely be accessed and possibly mutated (e.g., added to, removed from, and have existing elements modified). Such operations may have different performance characteristics based on the type of data structure(s) used.

A third phase 440 is identified as an "uninitialize_system" phase, and is represented by a start annotation and an end annotation. In the third example phase 440, the program is shutting down, and the populated data structures are deconstructed (e.g., removed). This may be useful information to have in that if the MLDS system knows a priori that no further accesses will be made to the DSes, there are certain optimizations on deconstruction that can be made.

While in the illustrated example of FIG. 4 three phases 410, 430, 440 are shown, any number of phases may be annotated in the annotated instructions. Moreover, some phases may be internal to other phases. For example, an example outer phase may include multiple inner phases.

FIG. 5 is a flowchart representative of example machine readable instructions that may be executed to implement the example system of FIG. 1 and/or the example data structure selector of FIGS. 1 and/or 2 to learn annotation semantics. The example process 500 of the illustrated example of FIG. 5 begins when the example instruction accessor 205 inspects an instruction in the annotated instructions 201. (Block 505). The example annotation identifier 510 determines whether the instruction identified by the instruction accessor 205 is a start annotation. (Block 510). In examples disclosed herein, start annotations are identified using the text "mlds:start_phase". However, any other annotation format may additionally or alternatively be used to identify the start of a phase. In some examples, the start annotation may be included in a comment (e.g., inserted by a developer).

If the example annotation identifier 210 determines that the instruction is a start annotation (e.g., block 510 returns result of YES), the example phase tracker 215 records the opening of a phase. (Block 515). The example phase tracker 215 records a phase opening record into the cost data store 220. The example instruction accessor 205 then identifies the next instruction. (Block 520). The instruction accessor 205 determines whether the next instruction represents the end of the program. (Block 525). If the example instruction accessor 205 determines that the next instruction does not represent the end of the program (e.g., block 525 returns a result of NO), control returns to block 505 where the example process 500 of FIG. 5 continues.

Returning to block 510, if the example annotation identifier 210 determines that the instruction is not a start annotation (e.g. block 510 returns a result of NO), the example annotation identifier 210 determines whether the instruction is an end annotation. (Block 530). In examples disclosed herein, end annotations are identified using the text "mlds:end_phase". However, any other annotation format may additionally or alternatively be used to identify the end of a phase. In some examples, the end annotation may be included in a comment (e.g., inserted by a developer).

If the example annotation identifier 210 determines that the instruction is an end annotation (e.g., block 530 returns result of YES), the example phase tracker 215 adds a record to the cost data store 220 signifying the closing of the phase. (Block 535). In examples disclosed herein, the closing record identifies the most recently opened (but not yet closed) phase. The example instruction accessor 205 then identifies the next instruction. (Block 520). The instruction accessor 205 determines whether the next instruction represents the end of the program. (Block 525). If the example instruction accessor determines that the next instruction does not represent the end of the program (e.g., block 525 returns a result of NO), control returns to block 505 where the example process 500 of FIG. 5 continues.

Returning to block 530, if the example annotation identifier 210 determines that the instruction is not an end annotation (e.g., block 530 returns a result of NO), the example annotation identifier 210 determines whether the instruction, when executed, would result in interaction with a data structure. (Block 540). In examples disclosed herein, interaction with the data structure refers to any operation with respect to a data structure (e.g., a read operation, a write operation, a sort operation, etc.). The example cost predictor 225 predicts a cost of the interaction for different data structures that could be used to store the data. (Block 545). For example, if the instruction were to add a value to a data structure (e.g., a write operation), the cost predictor 225 estimates the cost (e.g., in execution time, memory, processor cycles, power consumption, etc.) of adding the value to different data structures that support addition of the value (e.g., a hash, an array, a list, etc.). The example cost predictor 225 adds the predicted cost(s) to the cost datastore 220 in association with the most recently opened phase and data structure type. (Block 550).

Upon the addition of the predicted cost (e.g., blocks 545 and/or 550) or the determination that the instruction does not result in data modification (e.g., block 540 returns a result of NO), the example instruction executor 230 executes the instruction. (Block 560). In examples disclosed herein, if the instruction would result in interaction with the data structure, a single data structure is used as a placeholder (e.g., as opposed to each of the different types of data structures). Using a placeholder data structure enables data to be stored in a manner that allows the execution of the program to proceed and result in an accurate prediction of estimated interaction cost(s).

The example instruction accessor 205 then identifies the next instruction. (Block 520). The instruction accessor 205 determines whether the next instruction represents the end of the program. (Block 525). If the example instruction accessor 205 determines that the next instruction does not represent the end of the program (e.g., block 525 returns a result of NO), control returns to block 505 where the example process 500 of FIG. 5 continues. If, instead, the example instruction accessor 205 determines that the next instruction represents the end of the program (e.g., block 525 returns a result of YES), the example process 500 of FIG. 5 terminates.

Figure 6:
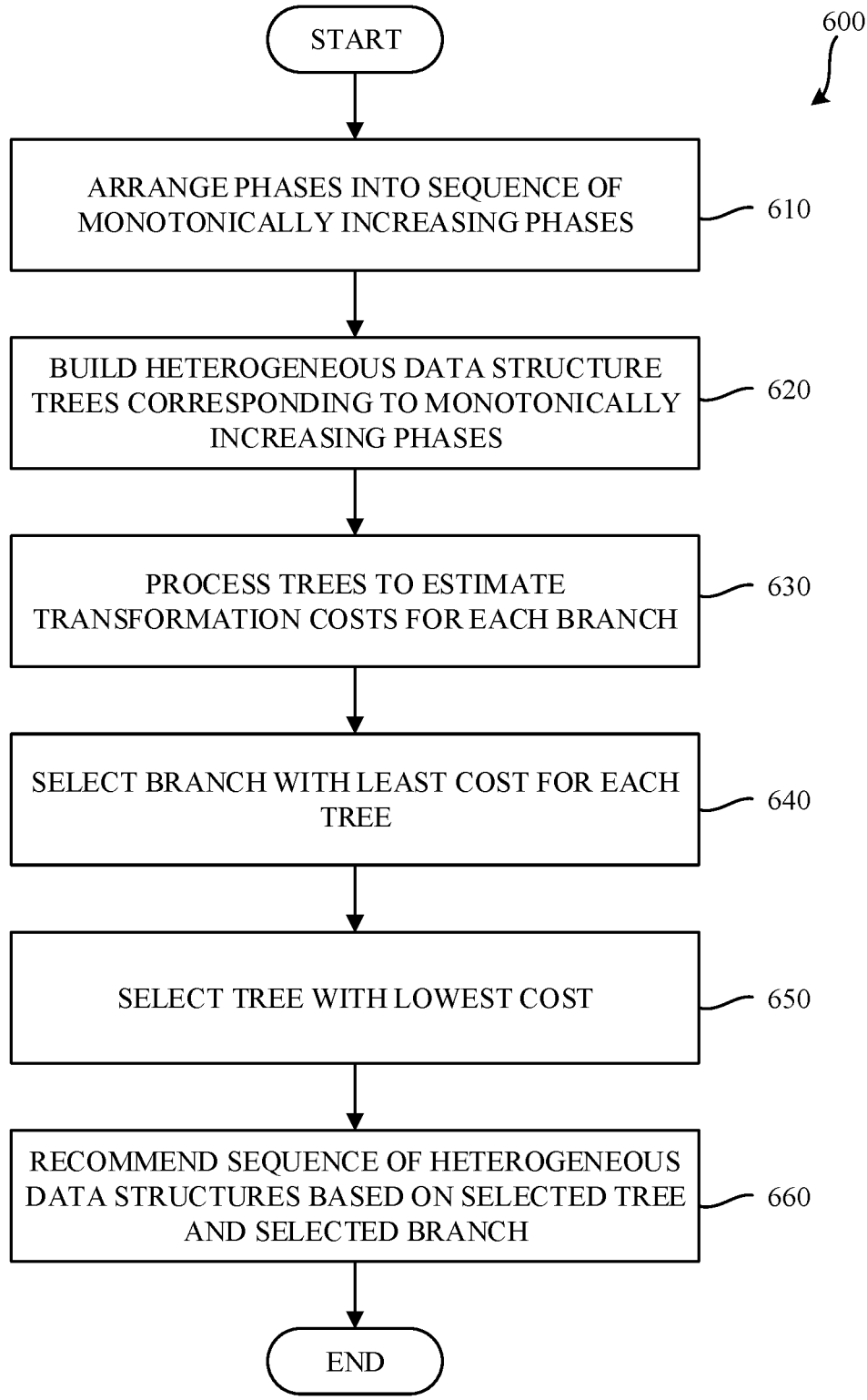
FIG. 6 is a flowchart representative of example machine readable instructions that may be executed to implement the example system of FIG. 1 and/or the example data structure selector of FIGS. 1 and/or 2 to select a data structure.

FIG. 6 is a flowchart representative of example machine readable instructions that may be executed to implement the example system of FIG. 1 and/or the example data structure selector 108 of FIGS. 1 and/or 2 to select a data structure. The example process 600 of FIG. 6 begins when the example tree constructor 240 arranges phases identified in FIG. 5 into a sequence of monotonically increasing phases. (Block 610). For example, consider a scenario where the target program includes a first populate phase, a first access phase, a second populate phase, and second access phase that are executed (in order). Although the target program has only two unique phases (e.g., a populate phase and an access phase), the sequential ordering of the phases may have temporal and spatial side-effects. For example, if the first populate phase uses a dynamic array for population and a binary tree were used for the first access phase, there is a specific array-to-tree data transformation cost and an additional specific tree-to-array data transformation cost moving from the first populate phase to the first access phase to the second populate phase to the second access phase, respectively. As such, each sequential phase that is executed is considered as unique even if it has been repeated multiple times.

Example approaches disclosed herein handle these specific data transformation side-effects by applying a unique monotonically increasing identifier to each phase. For example, the first populate phase receives ID 0, the first access phase receives ID 1, the second populate phase receives ID 2, and the second access phase receives ID 3. In examples disclosed herein, the identifier is a decimal number. However, any other number and/or data format may additionally or alternatively be used.

The example tree constructor 240 then builds heterogeneous data structure trees corresponding to the monotonically increasing phases. (Block 620). Example data structure trees are shown in the illustrated example of FIG. 7. Because, in some examples, a particular type of data structure may be more efficient when used in a particular phase, it may be more programmatically efficient to transition from a first data structure in a first phase to a second data structure and a second phase. The example data structure trees represent transitions between different types of data structures at such phase boundaries.

Figure 7:
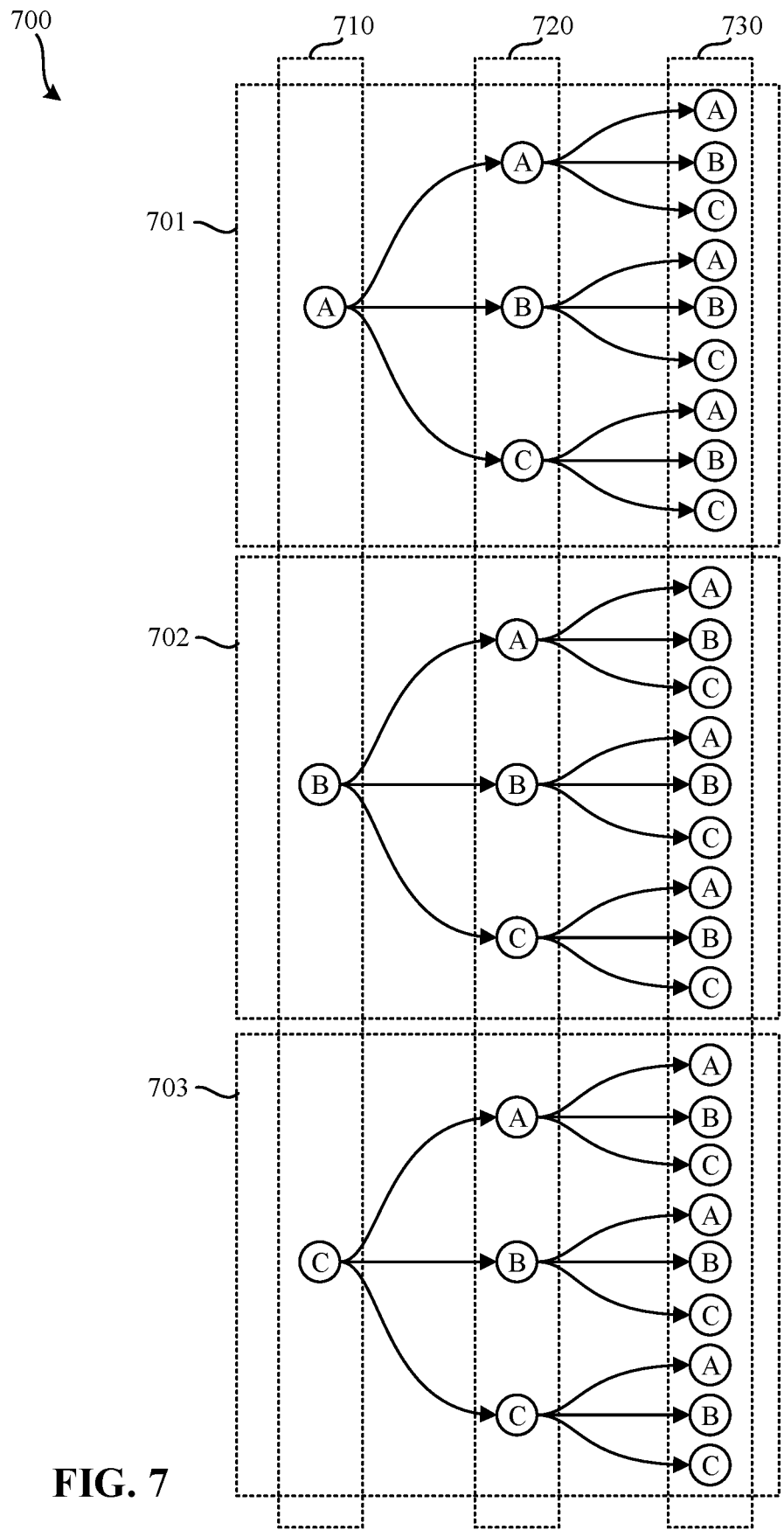
FIG. 7 is a diagram of example tree structures representing changes between different types of data structures throughout phases of execution of a program.

FIG. 7 is a diagram 700 of example tree structures representing changes between different types of data structures throughout phases of execution of a program. The example diagram 700 of FIG. 7 includes three example trees 701, 702, 703. Each example tree includes nodes aligned with identified phases of the target program, and edges connecting those nodes. Each node represents a selected data structure, and includes information (e.g., cost information) identifying the type(s) operations performed in that phase (e.g., read, write, read-and-write, read-dominated, write-dominated, etc.). Edges within the diagram represent estimated temporal and spatial costs of transitioning from a first data structure (e.g., represented towards the left side of the respective edge in FIG. 7) to a second data structure (e.g., represented towards the right side of the respective edge in FIG. 7).

The example tree constructor 240 builds N trees, where N represents the number of data structures available for use in the first phase. In the illustrated example of FIG. 3, three trees 701, 702, 703 are shown. However, any number of trees may additionally or alternatively be used. This ensures that all possible heterogeneous data structure permutations for all phases are generated. This approach ensures that the optimal combination of heterogeneous data structures are ultimately selected. In examples disclosed herein, the size of each tree is $\Sigma_{M-1 \ldots M} N^{(M-1)}$, where M=the total number of unique phases. Finally, the root of each tree is a data structure chosen for the first phase 710. The child nodes (e.g., represented in the second phase 720), are all data structure possibilities for the second phase. The subsequent child nodes (e.g., represented in the third phase 730) are all data structure possibilities for the third phase 730. In the illustrated example of FIG. 7, three phases 710, 720, 730 are represented. However, any number of phases may additionally or alternatively be used.

Returning to FIG. 6, the example transformation cost calculator 250 processes the trees to estimate transformation costs for each branch. (Block 630). The example transformation cost calculator 250 walks each tree and augments the edge-based data transformation costs based on the types of operations performed in that particular phase. For example, if the phase were to only include write operations, there may be no need for data transformation, because the new data structure can be generated without needing the data from the prior data structure. In examples disclosed herein, three costs are considered, including a normal data transformation cost, a fusion cost, and a linear data transformation cost. The example normal data transformation cost represents a cost to transition from phase N−1 to phase N to phase N+1, where N represents the current phase. The fusion cost represents the cost of the N−1 phase's data structure and the phase N's data structure into a singular N+1 data structure. The example linear data transformation cost represents a cost using phase N−1 's data structure with a zero data transformation cost for phase N and its normal data transformation cost for phase N+1. In some examples, when calculating the linear data transformation cost, the example transformation cost calculator 250 also augments the actual cost estimate of phase N operations using phase N−1's data structure for completeness.

The example branch selector 260 selects a branch representing transitions between data structures with a least cost for each tree. (Block 640). For example, with respect to the first tree of the illustrated example of FIG. 7, the cost of the data structure sequence ABA may have a lower cost than the data structure sequence ABC. In such an example, the branch selector 260 selects the data structure sequence ABA from the first example tree 701. Likewise, the example branch selector 260 may select the data structure sequence BAC from the second example tree 702, etc.

In some examples, the branch selector 260 selects the most efficient cost based on any of the example cost calculation approaches disclosed above. If, for example, the branch selector 260 were to use the linear data transformation cost, the example branch selector compresses the branch by one node, fusing phase N−1 and phase N into a single node, and adding the computational node cost of phase N−1 and N together. This process may be repeated to combine multiple additional phases into a single phase.

The example branch selector 260 then selects the tree having a branch with the lowest cost. (Block 650). For example, if the data structure sequence ABA (e.g., from the first tree 701) has a lower cost than the data structure sequence BAC (e.g., from the second tree 702), the example branch selector selects the data structure sequence ABA (e.g., from the first tree 701). The example data structure recommender 270 recommends the sequence of heterogeneous data structures selected by the branch selector 260. (Block 660). The example process 600 of FIG. 6 then terminates.

Figure 8:
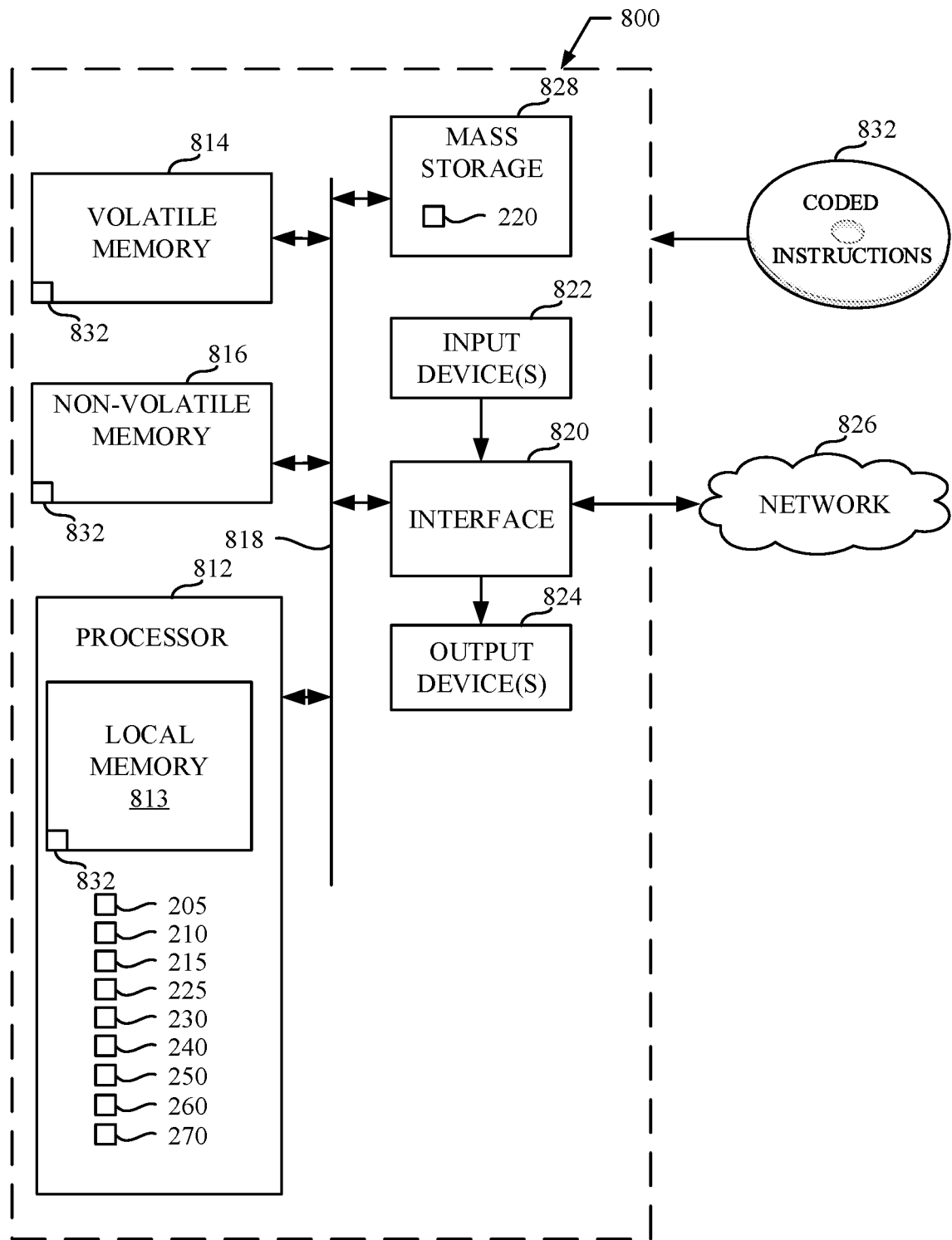
FIG. 8 is a block diagram of an example processing platform structured to execute the instructions of FIGS. 3, 4, and/or 6 to implement the example data structure selection system of FIG. 1 and/or the example data structure selector of FIGS. 1 and/or 2.

FIG. 8 is a block diagram of an example processor platform 800 structured to execute the instructions of FIGS. 3, 5, and/or 6 to implement the data structure selector 108 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example instruction accessor 205, the example annotation identifier 210, the example phase tracker 215, the example cost predictor 225, the example instruction executor 230, the example tree constructor 240, the example transformation cost calculator 250, the example branch selector 260, and/or the example data structure recommender 270.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-sight wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3, 5, and/or 6 may be stored in the mass storage device 828, in the volatile memory 814, in the non-volatile memory 816, and/or on a removable non-transitory computer readable storage medium such as a CD or DVD. In some examples, the mass storage device 828 implements the example cost datastore 220.

From the foregoing, it will be appreciated that example methods, apparatus and articles of manufacture have been disclosed that enable selection of a sequence of heterogeneous data structures for use in a target program. The disclosed methods, apparatus and articles of manufacture improve the efficiency of using a computing device by enabling use of these sequences of heterogeneous data structures when efficiencies of such use would otherwise not be recognized. The disclosed methods, apparatus and articles of manufacture are accordingly directed to one or more improvement(s) in the functioning of a computer.

Further examples and combinations thereof include the following:

Example 1 includes an apparatus for selecting sequences of data structures, the apparatus comprising a phase tracker to identify phases of execution of a target program, the phases including a first phase and a second phase, a cost predictor to estimate interaction costs of interacting with respective types of data structures within the first phase and the second phase, a tree constructor to construct a tree corresponding to a first data structure type, the tree including a first node in the first phase, a second node in the second phase, and an edge connecting the first node and the second node, the second node representing a second data structure type different from the first data structure type, a transformation cost calculator to calculate a transformation cost for the edge, and a branch selector to select a sequence of data structures including the first data structure type and the second data structure type based on the combined interaction costs and transformation costs.

Example 2 includes the apparatus of example 1, further including an annotation identifier to inspect annotated instructions corresponding to the target program, the inspection of the annotated instructions to enable the phase tracker to identify the first phase and the second phase.

Example 3 includes the apparatus of example 2, wherein the annotated instructions represent source code.

Example 4 includes the apparatus of example 1, further including an instruction executor to execute the target program using a placeholder data structure.

Example 5 includes the apparatus of example 1, further including a data structure recommender to provide a recommendation of the sequence of data structures.

Example 6 includes the apparatus of example 1, wherein the sequence of data structures is a sequence of heterogeneous data structures.

Example 7 includes At least one non-transitory machine readable medium comprising instructions that, when executed, cause at least one processor to at least identify phases of execution of a target program, the phases including a first phase and a second phase, estimate interaction costs of interacting with respective types of data structures within the first phase and the second phase, construct a tree corresponding to a first data structure type, the tree including a first node in the first phase, a second node in the second phase, and an edge connecting the first node and the second node, the second node representing a second data structure type different from the first data structure type, calculate a transformation cost for the edge, and select a sequence of data structures including the first data structure type and the second data structure type based on the combined interaction costs and transformation costs.

Example 8 includes the at least one machine readable medium of example 7, wherein the instructions, when executed, cause the at least one processor to inspect annotated instructions corresponding to the target program to identify a start annotation and an end annotation.

Example 9 includes the at least one machine readable medium of example 8, wherein the annotated instructions represent source code.

Example 10 includes the at least one machine readable medium of example 7, wherein the instructions, when executed, cause the at least one processor to execute the target program using a placeholder data structure.

Example 11 includes the at least one machine readable medium of example 7, wherein the instructions, when executed, cause the at least one processor to provide a recommendation of the sequence of data structures.

Example 12 includes the at least one machine readable medium of example 7, wherein the sequence of data structures is a sequence of heterogeneous data structures.

Example 13 includes an apparatus for selecting sequences of data structures, the apparatus comprising means for tracking phases of execution of a target program, the phases including a first phase and a second phase, means for estimating interaction costs of interacting with respective types of data structures within the first phase and the second phase, means for constructing to construct a tree corresponding to a first data structure type, the tree including a first node in the first phase, a second node in the second phase, and an edge connecting the first node and the second node, the second node representing a second data structure type different from the first data structure type, means for calculating a transformation cost for the edge, and means for selecting a sequence of data structures including the first data structure type and the second data structure type based on the combined interaction costs and transformation costs.

Example 14 includes the apparatus of example 13, further including means for inspecting annotated instructions corresponding to the target program, the inspection of the annotated instructions to enable the means for tracking to identify the first phase and the second phase.

Example 15 includes the apparatus of example 14, wherein the annotated instructions represent source code.

Example 16 includes the apparatus of example 13, further including means for executing the target program using a placeholder data structure.

Example 17 includes the apparatus of example 13, further including means for recommending the sequence of data structures.

Example 18 includes the apparatus of example 13, wherein the sequence of data structures is a sequence of heterogeneous data structures.

Example 19 includes a method of selecting sequences of data structures, the method comprising identifying phases of execution of a target program, the phases including a first phase and a second phase, estimating, by executing an instruction with at least one processor, interaction costs of interacting with respective types of data structures within the first phase and the second phase, constructing, by executing an instruction with the at least one processor, a tree corresponding to a first data structure type, the tree including a first node in the first phase, a second node in the second phase, and an edge connecting the first node and the second node, the second node representing a second data structure type different from the first data structure type, calculating, by executing an instruction with the at least one processor, a transformation cost for the edge, and selecting a sequence of data structures including the first data structure type and the second data structure type based on the combined interaction costs and transformation costs.

Example 20 includes the method of example 19, wherein the phases of execution of the target program are identified by inspecting annotated instructions corresponding to the target program to identify a start annotation and an end annotation.

Example 21 includes the method of example 20, wherein the annotated instructions represent source code.

Example 22 includes the method of example 19, further including executing the target program using a placeholder data structure.

Example 23 includes the method of example 19, further including providing a recommendation of the sequence of data structures.

Example 24 includes the method of example 19, wherein the sequence of data structures is a sequence of heterogeneous data structures.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. At least one non-transitory computer readable medium including instructions to select sequences of data structures, the instructions comprising:
    phase tracker instructions to identify phases of execution of a target program, the phases including a first phase and a second phase;
    cost predictor instructions to estimate interaction costs of interacting with respective types of data structures within the first phase and the second phase;
    tree constructor instructions to construct a tree, the tree including a first node in the first phase, a second node in the second phase, and an edge connecting the first node and the second node, the first node representing a first data structure type, the second node representing a second data structure type different from the first data structure type;
    transformation cost calculator instructions to calculate a transformation cost for the edge, the transformation cost representing a cost of transforming data from the first data structure type to the second data structure type; and
    branch selector instructions to select a sequence of data structures including the first data structure type and the second data structure type based on the combined interaction costs and transformation costs.

2. The at least one non-transitory computer readable medium of claim 1, further including annotation identifier instructions to inspect annotated instructions corresponding to the target program, the inspection of the annotated instructions to enable the phase tracker instructions to identify the first phase and the second phase.

3. The at least one non-transitory computer readable medium of claim 2, wherein the annotated instructions represent source code.

4. The at least one non-transitory computer readable medium of claim 1, further including instruction executor instructions to execute the target program using a placeholder data structure.

5. The at least one non-transitory computer readable medium of claim 1, further including data structure recommender instructions to provide a recommendation of the sequence of data structures.

6. The at least one non-transitory computer readable medium of claim 1, wherein the sequence of data structures is a sequence of heterogeneous data structures.

7. At least one non-transitory machine readable medium comprising instructions that, when executed, cause at least one processor to at least:
    identify phases of execution of a target program, the phases including a first phase and a second phase;
    estimate interaction costs of interacting with respective types of data structures within the first phase and the second phase;
    construct a tree, the tree including a first node in the first phase, a second node in the second phase, and an edge connecting the first node and the second node, the first node representing a first data structure type, the second node representing a second data structure type different from the first data structure type;
    calculate a transformation cost for the edge, the transformation cost representing a cost of transforming data from the first data structure type to the second data structure type; and
    select a sequence of data structures including the first data structure type and the second data structure type based on the combined interaction costs and transformation costs.

8. The at least one machine readable medium of claim 7, wherein the instructions, when executed, cause the at least one processor to inspect annotated instructions corresponding to the target program to identify a start annotation and an end annotation.

9. The at least one machine readable medium of claim 8, wherein the annotated instructions represent source code.

10. The at least one machine readable medium of claim 7, wherein the instructions, when executed, cause the at least one processor to execute the target program using a placeholder data structure.

11. The at least one machine readable medium of claim 7, wherein the instructions, when executed, cause the at least one processor to provide a recommendation of the sequence of data structures.

12. The at least one machine readable medium of claim 7, wherein the sequence of data structures is a sequence of heterogeneous data structures.

13. An apparatus for selecting sequences of data structures, the apparatus comprising:
    means for tracking phases of execution of a target program, the phases including a first phase and a second phase;
    means for estimating interaction costs of interacting with respective types of data structures within the first phase and the second phase;
    means for constructing to construct a tree, the tree including a first node in the first phase, a second node in the second phase, and an edge connecting the first node and the second node, the first node representing a first data structure type, the second node representing a second data structure type different from the first data structure type;
    means for calculating a transformation cost for the edge, the transformation cost representing a cost of transforming data from the first data structure type to the second data structure type; and
    means for selecting a sequence of data structures including the first data structure type and the second data structure type based on the combined interaction costs and transformation costs.

14. The apparatus of claim 13, further including means for inspecting annotated instructions corresponding to the target program, the inspection of the annotated instructions to enable the means for tracking to identify the first phase and the second phase.

15. The apparatus of claim 14, wherein the annotated instructions represent source code.

16. The apparatus of claim 13, further including means for executing the target program using a placeholder data structure.

17. The apparatus of claim 13, further including means for recommending the sequence of data structures.

18. The apparatus of claim 13, wherein the sequence of data structures is a sequence of heterogeneous data structures.

19. A method of selecting sequences of data structures, the method comprising:
    identifying phases of execution of a target program, the phases including a first phase and a second phase;

estimating, by executing an instruction with at least one processor, interaction costs of interacting with respective types of data structures within the first phase and the second phase;

constructing, by executing an instruction with the at least one processor, a tree, the tree including a first node in the first phase, a second node in the second phase, and an edge connecting the first node and the second node, the first node representing a first data structure type, the second node representing a second data structure type different from the first data structure type;

calculating, by executing an instruction with the at least one processor, a transformation cost for the edge, the transformation cost representing a cost of transforming data from the first data structure type to the second data structure type; and selecting a sequence of data structures including the first data structure type and the second data structure type based on the combined interaction costs and transformation costs.

20. The method of claim 19, wherein the phases of execution of the target program are identified by inspecting annotated instructions corresponding to the target program to identify a start annotation and an end annotation.

21. The method of claim 20, wherein the annotated instructions represent source code.

22. The method of claim 19, further including executing the target program using a placeholder data structure.

23. The method of claim 19, further including providing a recommendation of the sequence of data structures.

24. The method of claim 19, wherein the sequence of data structures is a sequence of heterogeneous data structures.

25. An apparatus for selecting sequences of data structures, the apparatus comprising:
memory;
instructions; and
at least one processor to execute the instructions to:
identify phases of execution of a target program, the phases including a first phase and a second phase;
estimate interaction costs of interaction with respective types of data structures within the first phase and the second phase;
construct a tree, the tree including a first node in the first phase, a second node in the second phase, and an edge to connect the first node and the second node, the first node to represent a first data structure type, the second node to represent a second data structure type different from the first data structure type;
calculate a transformation cost for the edge, the transformation cost to represent a cost of transformation of data from the first data structure type to the second data structure type; and
select a sequence of data structures including the first data structure type and the second data structure type based on the combined interaction costs and the transformation costs.

26. The apparatus of claim 25, wherein the instructions, when executed, cause the at least one processor to inspect annotated instructions corresponding to the target program to identify a start annotation and an end annotation.

27. The apparatus of claim 25, wherein the instructions, when executed, cause the at least one processor to execute the target program using a placeholder data structure.

* * * * *